(12) United States Patent
Furrer

(10) Patent No.: US 7,607,637 B2
(45) Date of Patent: Oct. 27, 2009

(54) REDUCTION GEARING FOR AN ELECTRIC ACTUATOR

(75) Inventor: Andreas Furrer, Wetzikon (CH)

(73) Assignee: Belimo Holding AG, Hinwil (CH)

( * ) Notice: Subject to any disclaimer, the term of this patent is extended or adjusted under 35 U.S.C. 154(b) by 213 days.

(21) Appl. No.: 10/599,024

(22) PCT Filed: Mar. 3, 2005

(86) PCT No.: PCT/CH2005/000126

§ 371 (c)(1),
(2), (4) Date: Sep. 18, 2006

(87) PCT Pub. No.: WO2005/090831

PCT Pub. Date: Sep. 29, 2005

(65) Prior Publication Data

US 2007/0170385 A1   Jul. 26, 2007

(30) Foreign Application Priority Data

Mar. 19, 2004 (CH) .................................. 465/04

(51) Int. Cl.
*F16K 31/02* (2006.01)
(52) U.S. Cl. ................ 251/129.11; 251/248; 251/250.5
(58) Field of Classification Search ............ 251/129.11, 251/129.12, 129.13, 248, 250.5
See application file for complete search history.

(56) References Cited

U.S. PATENT DOCUMENTS

| 4,089,505 | A | * | 5/1978 | Anderle et al. | 251/129.11 |
| 6,098,957 | A | * | 8/2000 | Vepy | 251/129.12 |
| 6,626,421 | B2 | * | 9/2003 | Torii et al. | 251/305 |
| 6,974,119 | B2 | * | 12/2005 | Brendle et al. | 251/129.11 |
| 7,055,795 | B2 | * | 6/2006 | Lay | 251/129.03 |
| RE39,257 | E | * | 9/2006 | Kamimura et al. | 123/300 |

* cited by examiner

*Primary Examiner*—John K Fristoe, Jr.
(74) *Attorney, Agent, or Firm*—Thaddius J. Carvis

(57) ABSTRACT

The invention relates to reduction gearing (10) for an electrically driven actuator for controlling a gaseous or liquid volumetric flow (98), in particular in the fields of heating, ventilation and air conditioning technology and fire and smoke protection, said reduction gearing (10) being modular. Said gearing consists essentially of primary gearing (12) containing at least one drive motor (20) and secondary gearing (14) with a power take-off (36). In addition, a self-limiter (16) is integrated into the primary gearing (12). The gearing modules (12, 14) are detachably interconnected, in particular various secondary gearing mechanisms (14) can be used for the primary gearing (12). The inventive reduction gearing (10) is advantageously complemented in particular by a modular actuator comprising a modular housing, a modular electronics system (38), a sensor and COM module and a coupling module (28).

13 Claims, 3 Drawing Sheets

REDUCTION GEARING FOR AN ELECTRIC ACTUATOR

Figure 1:
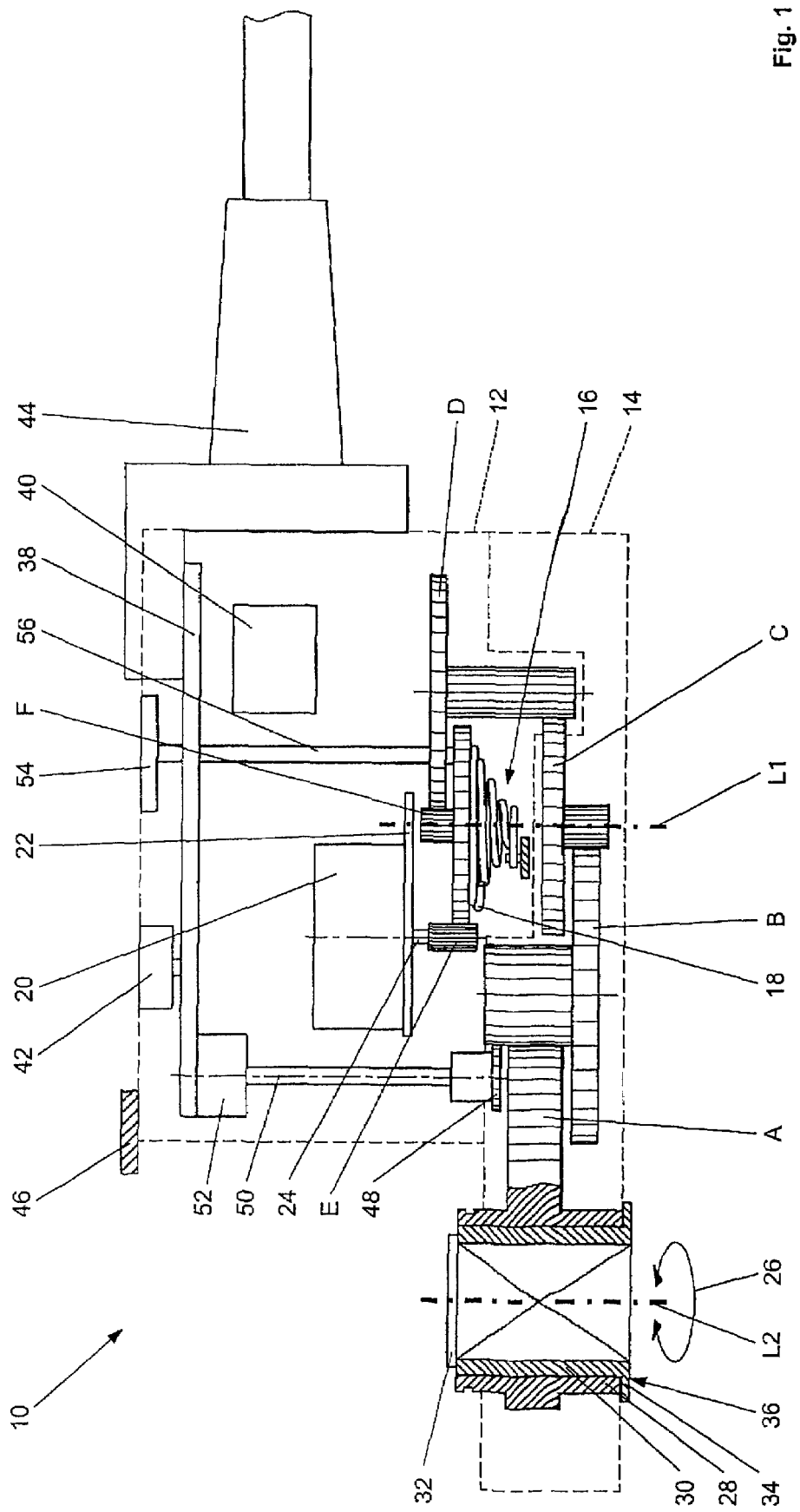

The invention relates to a reduction gearing of an electrically operated actuator to control a gaseous or liquid volume flow, in particular in the field of heating, ventilation and air conditioning, fire or smoke protection.

Electric actuator drives for motorising actuators in heating, ventilation and air conditioning systems (HLK) have been produced for more than 30 years. HLK actuators guarantee an economic volume flow control of gas or liquid, in particular air and water. As a compact unit they comprise not only the drive but also pressure sensors and regulators combined in one unit.

Ventilation systems are used increasingly in buildings, in particular residential, office, commercial and industrial buildings, normally combined with fire and smoke protection devices. In ventilation systems, volume flow control with swivellable air flaps plays an essential role. The volume flow is measured with a suitable measuring instrument such as for example the NMV-D2M by Belimo Automation AG, CH-8340 Hinwil, that is formed as a compact unit of drive, pressure sensor and regulator, and passes measurement values to an electronics unit.

In modern building systems, as well as AC devices, DC devices are increasingly used. A DC 24V power supply can be used directly, no separate power supply with transformer being required.

To move a flap in a ventilation system or a tap in a water pipe system, relatively weak motors must activate large surface or large volume control elements. Precise and stable adjustment is possible only with very great reduction gearing. To swivel a flap or turn a tap through an acute or right angle, numerous rotations of the electric motor shaft are required. The electronics process the control signals and control the electric motor.

CH 614507 A5 describes an actuator drive with an electric motor and gearing for the ventilation system. The drive unit can be pushed onto a flap or valve shaft. The last toothed gear element is formed as a tooth segment and fitted with a hollow shaft that is mounted radially rotatable but axially fixed in a base plate of the actuator drive. The electric motor can remain connected after reaching the end stops which restrict the rotation angle of the tooth segment. The actuator drive described is used in air flaps, mixer taps and throttle valves in heating and ventilation systems. The reduction gearing system described is appliance-specific.

The invention is based on the object of creating a reduction gearing of the type cited initially which is versatile in use, offers low production and storage costs, but achieves the same output for approximately the same operating costs.

The object is achieved according to the invention in that a modularly constructed reduction gearing comprises a primary gearing with at least one drive motor and a secondary gearing with an output drive, wherein a self-lock is integrated, and the gear modules are connected together detachably. Special and further embodiments of the invention are the object of dependent claims.

The ability of modular primary and secondary gearings to be combined in an arbitrary fashion, following the rules of combination systems, allows the following number K of combinations:

$$K = n.m$$

where n=number of primary gearings
m=number of secondary gearings

Thus for example with 6 primary gearings and 6 secondary gearings, 36 combinations of reduction gearings for electric actuators are possible; with 3 primary gearings and 10 secondary gearings, 30 combinations.

Self-locking in the present sense occurs when a control element i.e. a flap, a valve, in particular a tap or a lift valve, has reached the end position and the electric motor has switched off. In this situation the gearing must remain position-stable and may not move if the gas or liquid volume flow changes. This situation corresponds to that of a self-locking screw.

The self-lock between the primary and secondary gearing may be a non-switchable or a switchable coupling.

The self-lock is preferably formed as a torque-limiting coupling, in particular a friction coupling or a brake coupling. In the rest position, the axially resilient self-lock is compressed according to the friction force to be generated, the rotationally stiff self-lock in contrast is relaxed in relation to a torque. On connection of the drive motor the rotationally stiff self-lock is tensioned, even after turning through an angle of a few degrees the self-lock begins to slip at the point of least resistance until the drive motor is switched off, then immediately a block is applied by the self-lock. Instead of a mechanical friction coupling any other coupling with the same effect can be formed, in particular a corresponding magnetic coupling. The expression "slip" is used for the sake of simplicity also for a magnetic coupling.

In a second variant the self-lock can have a friction surface on both sides in relation to the axial direction. Suitably, the resistance to a torque is not equally large but different. This is achieved by different sized friction radii of the rotation axes of the gear wheels concerned. By application of the lever law, it can be concluded that with the same friction coefficient and the same pressure, the friction surface with the smaller radius r begins to slip before the friction surface with the larger radius R. The same applies, as already indicated, for a magnetic coupling.

In practice the larger friction radius R is normally allocated to the primary gearing and the smaller friction radius r to a housing part. Without further measures the self-lock on the housing part begins to slip.

In a further variant of the invention the self-lock is formed as an externally activated switchable coupling. To this end, in the area of the small friction radius r, bolts or cams can be inserted to block the self-lock. Now the self-lock begins to slip in the area of the larger radius R when the drive motor of the primary gearing is engaged. This switch takes place when a larger resistance is necessary.

According to a further embodiment, the first free-running gear wheel with the primary gearing can be firmly connected with the self-lock and a housing part in the area of a small and a large friction radius can have contact surfaces for the self-lock but at a different level. The one friction surface is on an axially displaceable lifting bolt, the other friction surface is arranged concentric and annular. Using the lifting bolt e.g. a spring plate can be raised from the outer annular friction surface and now lies on the bolt itself. Because of the different friction radii R, r, the self-lock becomes substantially smaller.

The self-lock preferably comprises a rotationally stiff locking spring that can be tensioned in the axial direction of the gear wheels and is preferably formed as a conical compression spring, a coil spring or leaf spring. The different friction radii R, r are achieved by different length spring legs.

The self-lock i.e. the friction resistance can be increased by increasing the pressure in the axial direction. The pressure is increased equally for both radii R, r but because of the different radius or lever arm length, has a different effect.

Suitably the primary and secondary gearings can be decoupled so that each can rotate freely. This is achieved suitably by decoupling a gear wheel lying on the self-lock, preferably by pressing a release button.

For a position feedback for example a potentiometer can be used which decouples the last gear wheel in the direction of the output. To activate the primary and hence the secondary gearing, a drive motor of known type is used, in particular a DC motor, a brushless DC motor, a sensorless DC motor or a synchronous motor have proved suitable in practice.

With a view to operating safety, an energy accumulator can be integrated so that on a motor defect the actuator can nonetheless be activated. Preferably, the energy accumulator which Is arranged in the primary gearing is a mechanical spring, a battery or a condenser.

The secondary gearing, also by way of known means, is connected with a drive shaft of a flap, a tap or a linear motor for a lift valve, in particular a plug valve, suitably by means of a coupling module.

The advantages of the present invention can be summarised briefly as follows:

Due to the modular structure of the reduction gearing comprising primary gearing, secondary gearing and self-lock, a high device flexibility can be achieved with a low number of components.

Also the further constituents of the actuator can be formed modular, in particular the sensor and COM module, the electronics and the housing, whereby the advantage of a high device flexibility with a low number of assemblies is further enhanced.

The high device flexibility also has a positive effect for covering different applications.

The primary unit can be adapted to the electronic platform (size, motor technology).

All advantages of the electric actuators refined to a high level are retained.

Figure 2:
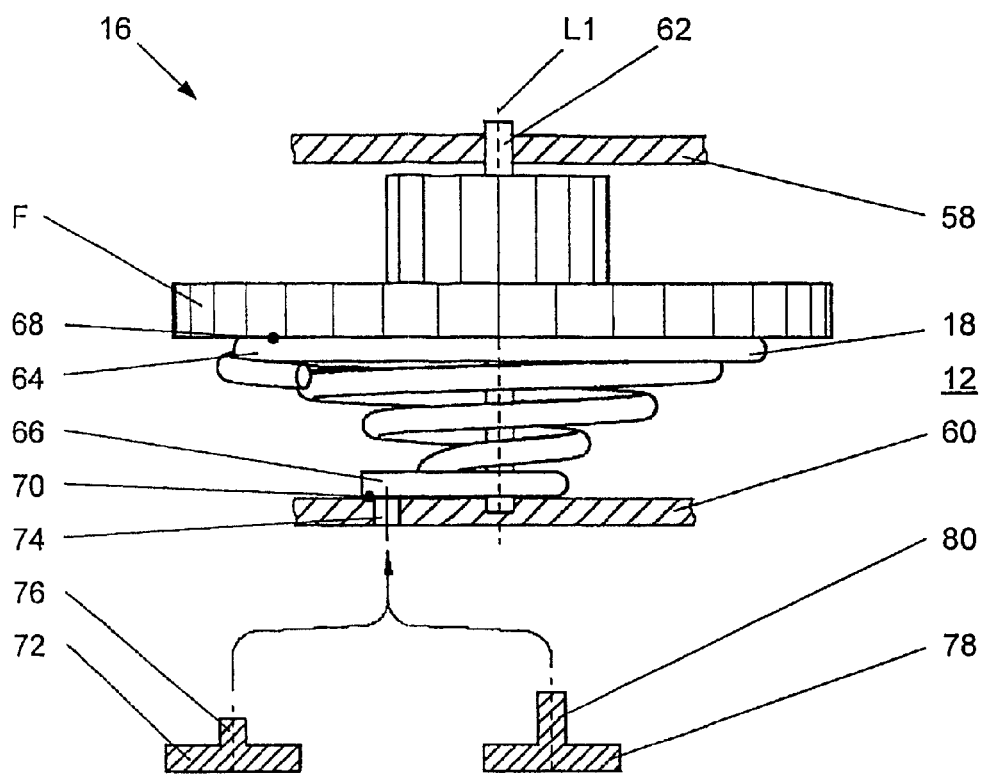
Figure 3:
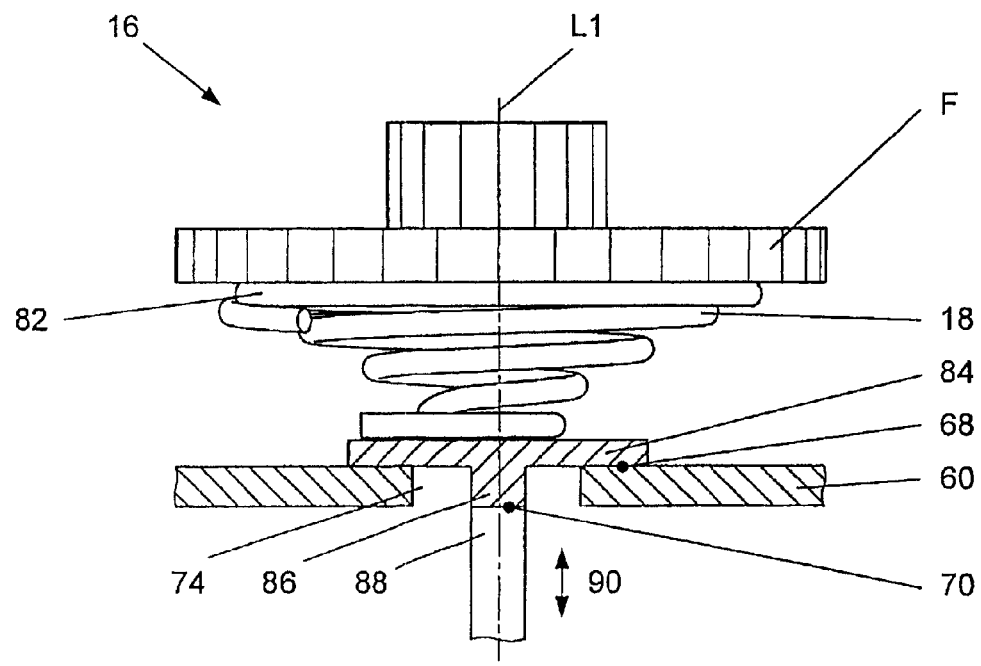
Figure 4:
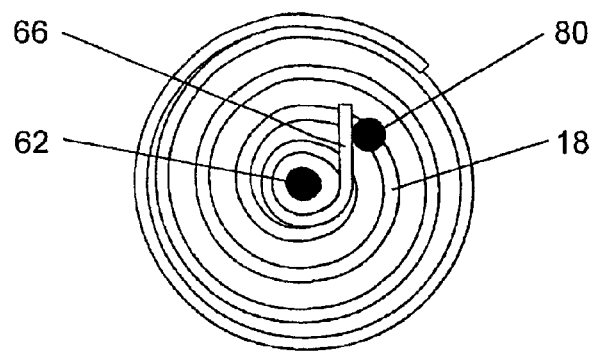
Figure 5:
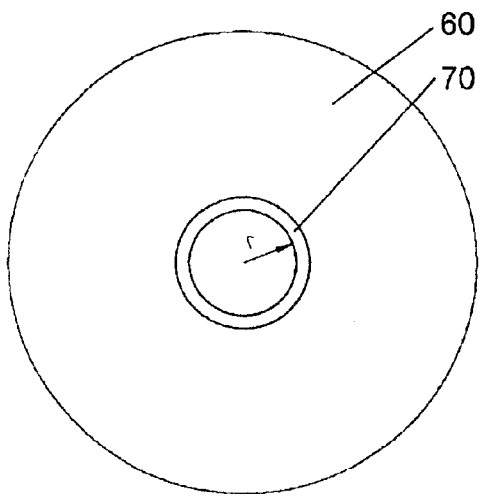
Figure 6:
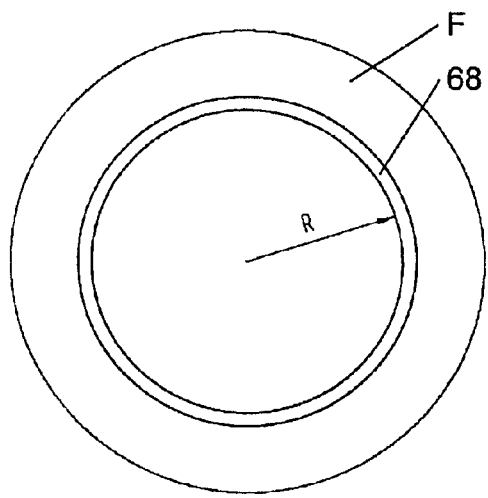
Figure 7:
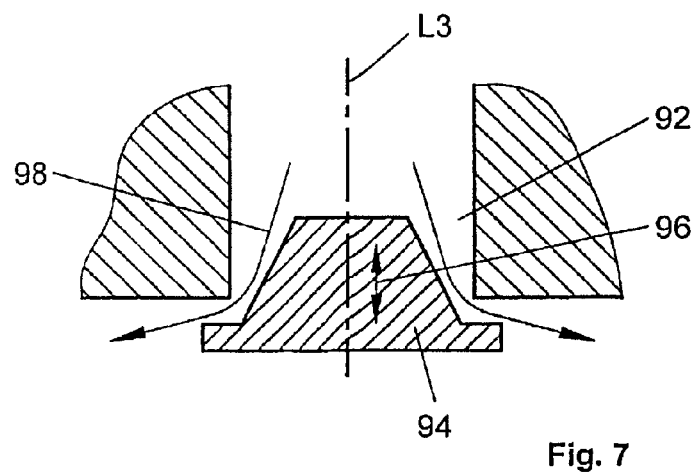

The invention is now described in more detail with reference to embodiment examples shown on the drawing, which are also the object of dependent claims. The drawings show diagrammatically:

FIG. 1 a view of a modular primary and secondary gearing with self-lock,

FIG. 2 a self-lock with a conical locking spring,

FIG. 3 a self-lock with two friction surfaces in the direction of a housing part, FIG. 4 a top view onto a spring guide, FIG. 5 a top view onto a housing part with an inner friction surface, FIG. 6 a top view onto a spur gear of a primary gearing with an outer friction surface, and FIG. 7 a cut-away view of a channel with a lifting valve.

The reduction gearing 10 shown in FIG. 1 comprises substantially a primary gearing 12 and a secondary gearing 14 which are formed modular and connected detachably together. Between a first freely rotating spur gear F and a housing part 60 (FIG. 2) is arranged a self-lock 16 which in the present case comprises a rotationally stiff locking spring 18 of spring steel.

A relatively low power drive motor 20, in the present case a DC motor which rests on a support 22, by way of a motor shaft 24 drives a longitudinal gear wheel E known as the E-wheel for short. This is engaged with a narrow spur gear of large diameter which is connected with or formed as one piece with a gear wheel of small diameter or a pinion (F-wheel). Finally a further gear wheel, the D-wheel, is allocated to the primary gearing 12.

A further reduction spur gear, the C-wheel coaxial with the F-wheel, is allocated to the secondary gearing 14, the common longitudinal axis $L_1$ is also the common longitudinal axis of the locking spring 18. A last axially symmetrical reduction spur gear—the B wheel—drives a segment which is also known as the A-wheel.

All gear wheels A to E have parallel axes $L_1$, $L_2$, and are constructed in the normal manner e.g. spur gears, worm gears, herringbone gears with normal toothing geometry, they comprise a metal and/or an abrasion-resistant plastic of high mechanical strength. Due to the high reduction ratio, a relatively weak electrical drive motor 20 is sufficiently strong. The swivel angle in the one or the other direction indicated with double arrow 26 can be set precisely The maximum swivel angle is in practice 90°, in relation to the longitudinal axis $L_2$ the swivel range is in particular between 30 and 90°.

The A-wheel is connected by way of a coupling module 28 with force and/or interference fit with a hollow shaft 30 which activates a flap, a ball valve or a linear motor. The longitudinal axis $L_2$ runs parallel to the longitudinal axis $L_1$. The hollow shaft 30 is mounted swivellably by way of an upper and a lower bearing 32, 34 in a housing 58, 60 indicated in FIG. 2 of a modularly constructed actuator and marked as output 36.

For the design of the actuators reference is made for example to the company brochure NEWS VAV NMV-D2M by Belimo Automation AG, CH-8340 Hinwil.

Arranged in the housing 60 of the primary gearing 12 is an also modular electronic unit 38 which for example issues the necessary control commands to the drive motor 20 and the energy accumulator 40 for emergency operation. These commands can also be input by way of a manually activatable control element 42. On the housing 58, 60 of the primary gearing 12 already mentioned is also attached an electrical connection 44 which in particular supplies the motor 20 and the energy accumulator 40. The modular construction also allows the driving of several secondary gearings 14 with the same primary gearing 12.

By way of a spur gear 48 which engages in the pinion of the gear wheel B, the rotational movement is transmitted by way of a shaft 50 to a potentiometer 52 for the position feedback to the electronics 38.

Finally, a manually activatable release button 54 is formed which can be pressed down manually. This pushes the F-wheel down along axis $L_1$, which is possible thanks to the locking spring 18, until the pinion of the F-wheel disengages from the D-wheel. This allows free-running for the primary gearing 12 and the secondary gearing 14 without dismantling the modules. The fact that the spur gear 48 of the potentiometer 52 is also turned when the secondary gearing 14 is activated in free running is insignificant due to the low resistance. Evidently, the actuator pin 56 of the release button 54 runs outside the D-wheel.

Of essential significance for the invention is the modular structure of the reduction gearing 10 comprising the primary gearing 12 and secondary gearing 14, but also the inclusion of a self-lock 16. The modular structure of the primary gearing 12 and secondary gearing 14 is designed so that the two modules 12, 14 connected together with releasable fixing means, for example screws or a fast closure, can be separated from each other quickly and easily. Thus, the pinion of the D-wheel is disengaged from the C-wheel. If a potentiometer 52 is arranged with a spur gear 48, the latter is also raised from the pinion of the B-wheel.

It is further of essential significance that between the F-wheel and a housing part 60 is fitted an integral self-lock 16. The rotationally stiff locking spring 18, with the correct spring strength and setting, prevents the two-part reduction gearing 10 from being able to move out of the set working position, in the present case due to sufficient friction force between the legs of the locking spring 18 and at least one inner face of the C-wheel and housing part 60. Details are evident in FIGS. 2, 3, 5 and 6.

FIG. 2 shows a first detailed embodiment of a self-lock 16 with a conical locking spring 18 of spring steel in the area of the primary gearing 12. Held in two housing parts 58, 60 is the gear wheel shaft 62 of the F-wheel which at the same time forms the spring guide for the locking spring 18. An upper longer spring leg 64 and a lower shorter spring leg 66 is formed. The locking spring 18 is tensioned in the direction of axis $L_1$ whereby the two spring legs 62, 64 are pressed onto the F-wheel and housing part 60, clearly both with the same force. Both spring legs 62, 64 form a friction surface 68, 70. When the E-wheel of the drive motor 20 (FIG. 1) exerts a torque on the F-wheel, the locking spring 18 with the shorter spring leg 66 slips on the friction surface 70. This is evident in view of the lever law.

FIG. 2 indicates two variants. A bore 74 in the housing part 60 can be closed in a first variant with a short trip cam 76 of a locking part 72 which corresponds at most to the thickness of the housing part 60. The friction force of the self-lock 16 or locking spring 18 can be increased if the bore 74 is closed with a long trip cam 80 of a closing part 78. This protrudes over the housing part 60 and blocks the shorter spring leg 66. On activation of the primary gearing 12, the shorter spring leg 66 knocks on the long trip cam 80 and cannot turn further. Therefore the longer spring leg 64 must turn on the friction surface 68, a higher resistance must be overcome than when both spring legs 64, 66 can rotate freely. Thanks to the switchable self-lock 16, two different self-locking forces are available.

Clearly, FIG. 2 can also be formed inversely as the shorter spring leg 66 lies on the wheel F, the longer spring leg 64 on the housing part 60. A switchable self-lock 16 is also possible in this way. Furthermore, the self-lock can be modified if for example spacers are placed between the F-wheel and the housing part 58. The two spring legs 64, 66 are thus pressed with greater or lesser force on the F-wheel or housing part 60, which affects the friction resistance. Finally, the self-lock can be modified in that one or both friction surfaces 68, 70 are coated and/or mechanically roughened e.g. by ribbing.

The self-lock 16 could in principle be attached to a gear wheel other than the F-wheel, but the effect is greater the closer it is located to the E-wheel of the drive motor 20.

FIG. 3 shows a self-lock in which the helical locking spring 18 is attached to wheel F. This can for example be achieved with a spring washer 82. In the lower area the locking spring 18 is attached to a spring plate 84 which in the area of the bore 74 lies freely on the housing part 60 and establishes the outer friction surface 68. In the central area the spring plate 84 has a coaxial peg 86 protruding downwards. A lifting bolt 88 which is coaxial in relation to longitudinal axis $L_1$ can be raised and lowered in the direction of double arrow 90 for example by means of an eccentric lever not shown. The spring plate 84 can be lifted from the housing part 60, the inner friction surface 70 is now formed by the peg 86 and lifting bolt 88. On rotation of the wheel F, the locking spring 18 also turns, as does the rotary table 84. The friction resistance is greater or smaller depending on the position of the lifting bolt 88. This self-lock 16 is also switchable.

FIG. 4 shows the switching of the self-lock 16 in FIG. 2. The locking spring 18 is mounted rotatably about the spring guide which is the gear wheel shaft 62 of wheel F. On activation of wheel F (FIG. 2) the shorter spring leg 66 knocks on the long trip cam 80 and thus blocks the rotation of the locking spring 18 which thanks to its rotationally stiff design is only deformed by a few degrees. In view of the large reduction, no spring back occurs on disengagement of the drive motor 20

Also with a view to FIG. 2, FIG. 5 shows an annular inner friction surface 70 with a smaller radius r on the housing part 60, of which a disc-like section is shown.

FIG. 6 also shows an annular outer friction surface 68 on the wheel F which has a larger radius R.

FIG. 7 shows the closure of a channel 92 with a lift valve 94 which in the present case is formed as a plug valve. The lift valve 94 can be activated by means of a linear motor which pushes the valve in the direction of double arrow 96 along the longitudinal axis $L_3$. For the sake of simplicity the linear motor is not shown. The control of an airflow 98 with a reduction gearing 10 according to the invention (FIG. 1) is indicated. For this the rotational movement is translated into a linear movement.

The invention claimed is:

1. Reduction gearing of an electrically operated actuator to control a gaseous or liquid volume flow in the field of heating, ventilation and air conditioning, fire or smoke protection, characterised in that a modularly constructed reduction gearing comprises a primary gear module with at least one drive motor and a secondary gear module with an output drive, wherein a self-lock is integrated, and said gear modules are connected together detachably, and wherein the self-lock has an outer friction surface with a large radius and an inner friction surface with a small radius, whereby with the same self-lock device, different values of resistance to a torque can be set.

2. Reduction gearing of an electrically operated actuator to control a gaseous or liquid volume flow in the field of heating, ventilation and air conditioning, fire or smoke protection, characterised in that a modularly constructed reduction gearing comprises a primary gear module with at least one drive motor and a secondary gear module with an output drive, wherein a self-lock is integrated, and said gear modules are connected together detachably, wherein the self-lock is formed as an externally activated switchable coupling, and wherein the self-lock in the area of the inner friction surface can be locked with a protruding trip cam.

3. Reduction gearing of an electrically operated actuator to control a gaseous or liquid volume flow in the field of heating, ventilation and air conditioning, fire or smoke protection, characterised in that a modularly constructed reduction gearing comprises a primary gear module with at least one drive motor and a secondary gear module with an output drive, wherein a self-lock is integrated, and said gear modules are connected together detachably, and wherein a gear wheel in engagement with the self-lock can be decoupled by way of a disengagement button on a housing cover.

4. Reduction gearing of an electrically operated actuator to control a gaseous or liquid volume flow in the field of heating, ventilation and air conditioning, fire or smoke protection, characterised in that a modularly constructed reduction gearing comprises a primary gear module with at least one drive motor and a secondary gear module with an output drive, wherein a self-lock is integrated, and said gear modules are connected together detachably, and wherein a potentiometer for a position feedback can be coupled into a pinion of a last gear wheel in a direction of an output by way of a gear wheel with a shaft.

5. Reduction gearing according to any of claims 1, 2, 3 or 4, characterised in that the gear modules are mutually interchangeable, where for the same primary gear module different secondary gear modules can be used.

6. Reduction gearing according to any of claims 1, 2, 3 or 4, characterised in that the self-lock which is arranged on a first free-running gear wheel is formed as a torque-limiting coupling.

7. Reduction gearing according to any of claims 1, 2, 3 or 4, characterised in that the self-lock is formed as a single or double mechanical friction coupling, magnetic coupling or other brake coupling.

8. Reduction gearing according to claim 1, characterised in that the outer friction surface is formed on a spur gear of the primary gear module, and the inner friction surface on a housing part, or conversely.

9. Reduction gearing according to claim 2, characterised in that the gear wheel of the primary gear module is firmly connected with the self-lock, a housing part forms an annular outer friction surface with a large radius and a lifting bolt which is adjustable in an axial direction forms an inner friction surface.

10. Reduction gearing according to claim 9, characterised in that the self-lock comprises a rotationally stiff locking spring which can be tensioned in the axial direction and is formed as a conical pressure spring, coil spring or leaf spring.

11. Reduction gearing according to any of claims 1, 2, 3 or 4, characterised in that the drive motor is formed as a DC motor, brushless DC motor, sensorless DC motor or synchronous motor.

12. Reduction gearing according to any of claims 1, 2, 3 or 4, characterised in that, with a view to the operating safety, an energy accumulator is integrated in a housing of the primary gearing.

13. Reduction gearing according to any of claims 1, 2, 3 or 4, characterised in that the secondary gearing is coupled with a hollow shaft to drive a flap, a tap or a linear motor for a lift valve.

* * * * *